(12) United States Patent  
Sandler et al.

(10) Patent No.: US 6,731,833 B2
(45) Date of Patent: May 4, 2004

(54) OPTICAL CROSS CONNECT SWITCH

(75) Inventors: Dave Sandler, San Diego, CA (US); Todd Barrett, San Diego, CA (US); Donald Bruns, San Diego, CA (US)

(73) Assignee: T-Rex Enterprises Corp., San Diego, CA (US)

( * ) Notice: Subject to any disclaimer, the term of this patent is extended or adjusted under 35 U.S.C. 154(b) by 52 days.

(21) Appl. No.: 09/846,879

(22) Filed: Apr. 30, 2001

(65) Prior Publication Data

US 2002/0122619 A1 Sep. 5, 2002

Related U.S. Application Data

(60) Provisional application No. 60/262,262, filed on Jan. 16, 2001, and provisional application No. 60/273,433, filed on Mar. 5, 2001.

(51) Int. Cl.⁷ .................................................. G02B 6/26
(52) U.S. Cl. .......................... 385/17; 385/16; 385/19; 385/24; 385/31; 385/33
(58) Field of Search .............................. 385/15–25, 31, 385/33, 47

(56) References Cited

U.S. PATENT DOCUMENTS

| 5,136,671 A | 8/1992 | Dragone |
| 5,243,672 A | 9/1993 | Dragone |
| 5,301,008 A | 4/1994 | Huang et al. |
| 5,524,153 A | 6/1996 | Laor |
| 5,594,820 A | 1/1997 | Garel-Jones et al. |
| 5,600,742 A | 2/1997 | Zirngibl |
| 5,621,829 A | 4/1997 | Ford |
| 5,623,564 A | 4/1997 | Presby |
| 5,647,044 A | 7/1997 | Basavanhally et al. |
| 5,654,819 A | 8/1997 | Goossen et al. |
| 5,699,462 A | 12/1997 | Fouquet et al. |
| 5,703,975 A | 12/1997 | Miller et al. |
| 5,721,796 A | 2/1998 | de Barros et al. |
| 5,771,320 A | 6/1998 | Stone |
| 5,825,517 A | 10/1998 | Antoniades et al. |
| 5,828,800 A | 10/1998 | Henry et al. |
| 5,841,500 A | 11/1998 | Patel |
| 5,841,917 A | 11/1998 | Jungerman et al. |
| 5,903,687 A | 5/1999 | Young et al. |
| 5,923,798 A | 7/1999 | Aksyuk et al. |
| 5,949,571 A | 9/1999 | Goossen et al. |
| 5,953,467 A | 9/1999 | Madsen |
| 5,960,133 A | 9/1999 | Tomlinson |
| 5,963,367 A | 10/1999 | Aksyuk et al. |
| 5,974,207 A | 10/1999 | Aksyuk et al. |
| 5,982,515 A | 11/1999 | Stone et al. |

(List continued on next page.)

FOREIGN PATENT DOCUMENTS

WO    WO-00/77556 A1    12/2000

Primary Examiner—Brian Healy
Assistant Examiner—Juliana Kang
(74) Attorney, Agent, or Firm—Gary Eastham

(57) ABSTRACT

An optical cross connect switch having a beam generating, beam directing, and beam receiving portions is disclosed. In one embodiment, the beam generating portion receives a number of optical fibers and generates a communication and companion alignment beam for each fiber. The communication and alignment beams may be spatially separated, substantially collimated beams, and are aligned to propagate away from the beam generating portion in substantially parallel paths. The communication and alignment beams then strike a beam directing element where they may be redirected to the beam receiving portion. A beam receiving portion includes a plurality of optical output fibers, each having an associated position sensor. The location where the alignment beam strikes the position sensor provides position information regarding the corresponding communication beam. Using the position information, the beam directing elements may be finely adjusted to direct the focused communication beam onto an optical output fiber.

39 Claims, 11 Drawing Sheets

U.S. PATENT DOCUMENTS

| | | |
|---|---|---|
| 5,994,159 A | 11/1999 | Aksyuk et al. |
| 5,995,688 A | 11/1999 | Aksyuk et al. |
| 6,002,818 A | 12/1999 | Fatehi et al. |
| 6,005,998 A | 12/1999 | Lee |
| 6,049,640 A | 4/2000 | Doerr |
| 6,067,389 A | 5/2000 | Fatehi et al. |
| 6,072,923 A | 6/2000 | Stone |
| 6,075,239 A | 6/2000 | Aksyuk et al. |
| 6,075,512 A | 6/2000 | Patel et al. |
| 6,091,867 A | 7/2000 | Young et al. |
| 6,094,246 A | 7/2000 | Wong et al. |
| 6,097,858 A | 8/2000 | Laor |
| 6,097,860 A | 8/2000 | Laor |
| 6,101,299 A | 8/2000 | Laor |
| 6,108,466 A | 8/2000 | Aksyuk et al. |
| 6,137,103 A | 10/2000 | Giles et al. |
| 6,137,941 A | 10/2000 | Robinson |
| 6,140,737 A | 10/2000 | Boie |
| 6,141,076 A | 10/2000 | Liu et al. |
| 6,141,467 A | 10/2000 | Doerr |
| 6,144,482 A | 11/2000 | Young et al. |
| 6,144,783 A | 11/2000 | Epworth et al. |
| 6,148,124 A | 11/2000 | Aksyuk et al. |
| 6,151,431 A | 11/2000 | White |
| 6,154,586 A | 11/2000 | MacDonald et al. |
| 6,163,643 A | 12/2000 | Bergmann et al. |
| 6,173,105 B1 | 1/2001 | Aksyuk et al. |
| 6,175,432 B1 | 1/2001 | Wu et al. |
| 6,181,844 B1 | 1/2001 | Goodman et al. |
| 6,181,845 B1 | 1/2001 | Horsthuis et al. |
| 6,188,814 B1 | 2/2001 | Bhalla |
| 6,188,815 B1 | 2/2001 | Schiaffino et al. |
| 6,192,171 B1 | 2/2001 | Goodman et al. |
| 6,192,172 B1 | 2/2001 | Fatehi et al. |
| 6,195,478 B1 | 2/2001 | Fouquet |
| 6,456,751 B1 * | 9/2002 | Bowers et al. ............... 385/16 |
| 2001/0016096 A1 | 8/2001 | Feldman et al. |

* cited by examiner

OPTICAL CROSS CONNECT SWITCH

RELATED APPLICATIONS

This Application is a Continuation-In-Part of Provisional Patent Application Serial No. 60/262,262, entitled "Method of Sensing the Pointing Of The Individual Beams Propagating From An Array of Optical Fibers and Stabilizing The Position of These Beams" filed Jan. 16, 2001, and Provisional Patent Application Serial No. 60/273,433, entitled "Optical Cross Connect Switching System" filed Mar. 5, 2001.

FIELD OF THE INVENTION

The present invention relates broadly to telecommunications equipment. More particularly, the present invention is useful in the fiber-optic segment of the telecommunications industry as a device for selectively coupling a first optical fiber to a second optical fiber selected from a number of optical fibers, such as in an optical cross connect.

BACKGROUND OF THE INVENTION

Over the past several decades, the telecommunications industry has exploded, and the incorporation of optical fiber into this industry is revolutionizing the way information is transmitted. Communication systems which use optical fiber as the transmission media offer some significant advantages over past wire-based systems, such as higher bandwidths and transmission rates, lower transmission losses, lower implementation costs, and greater electrical isolation.

Despite the benefits which exist in the optical transmission of information, one of the most difficult challenges in the widespread adoption of optical fiber in the telecommunications industry is the inability to route these optical signals effectively between optical fibers. The routing of these optical signals is typically accomplished using a cross-connect switch.

Historically, the switching of optical signals between optical fibers has included the detection and conversion of the optical signal to an electrical signal, and then switching and re-modulating the electrical signal to a new optical signal for transmission over a different optical fiber. Unfortunately, due to the power consumption and bandwidth limitations within the electronic switch circuitry and the expense of such a switching system, the optical-electrical-optical switch topology has not been widely adopted in the telecommunications industry.

Recently, a number of optical cross connect switches have been developed in order to switch optical signals directly from one fiber to another, thereby eliminating the need to convert the optical signal to an interim electrical signal. These optical switches incorporate various optical switch elements, such as mirrors, prisms, fiber collimators, and complicated drive mechanisms, to route optical signals through the switch. Unfortunately, some drive mechanisms are large, slow, and may severely limit the density of the switch. Also, due to the extremely tight tolerances necessary for proper angular alignment of the various reflective elements, and because the open-loop responses of these reflective elements is insufficient to step perfectly into position, a very sophisticated feedback control system is required, often resulting in these switches being prone to failure and requiring significant maintenance.

Despite the problems inherent to the optical switches currently available, single mode (SM) fiber, with its virtually unlimited bandwidth, has slowly become the standard in the telecommunication industry. Since the diameter of the core in a SM fiber is approximately ten (10) microns, the optical switches which use crude drive mechanisms are incapable of reliably switching the optical signals between fibers.

As the telecommunications industry continues to develop and grow to service more and more customers, the need for large scale, reliable optical switches will increase. Consequently, there is a need for an optical cross connect switch which can be readily integrated into existing telecommunications systems, and which can reliably switch optical signals from one of an array of SM input fibers, to one of an array of SM output fibers, and which can accomplish this switching quickly, with minimal power and at a minimal cost per channel.

SUMMARY OF THE INVENTION

The Optical Cross Connect Switch of the present invention includes three (3) basic components, including a beam generating portion, a beam directing portion, and a beam receiving portion. The beam generating portion receives a number of optical fibers which are each aligned with a lenslet for creating a communication beam. Another group of lenslets receive a light source, such as a light from a light emitting diode (LED), optical fiber, laser, vertical cavity surface emitting laser (VCSEL), and create a un-modulated companion alignment, or guidance, beam corresponding to each communication beam. The communication beam and its corresponding alignment beam are spatially separated, substantially collimated beams, and are aligned to propagate away from the beam generating portion to the beam directing portion.

The beam directing portion includes a first beam director and a second beam director, with each director having an array of beam-directing elements, such as micro electromechanical systems (MEMS) devices. Each communication beam and its corresponding alignment beam strikes a beam directing element on the first beam director, and is re-directed to a beam directing element on the second beam director, and propagates from beam directing portion towards beam receiving portion. The communication beam and its alignment beam may be substantially parallel, converging, or coaxial such that the two corresponding beams each strike the same beam director element.

The beam receiving portion includes a lenslet for each communication beam and a separate lenslet for its corresponding alignment beam. The lenslet focusses the communications beam onto an output fiber, and the separate lenslet focusses the alignment beam onto a position sensor. The focussed alignment beam creates a well defined "spot" whose position may be measured using classic spot centroiding algorithms, such as those techniques used in centroiding spots on a Hartmann sensor.

Importantly, the positional relationship between the communication beam and the alignment beam is known given any combination of beam directing elements in the first and second beam directors. Also, the positional relationship between the center of the output fiber and the sensor is also known. As a result of these known relationships, the position where the focussed alignment beam strikes the position sensor provides information regarding the position of the corresponding communication beam relative to the center of the output fiber. Thus, based on the position error feedback information from the position sensor, the beam directing elements are finely adjusted in order to precisely center the focussed communication beam onto the end of an optical output fiber, thereby increasing and potentially optimizing the amount of light received in the optical fiber. This method of precision alignment provides for an optical cross connect in which any input fiber may be optically connected to any output fiber, with minimal loss of the optical signal.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF A PREFERRED EMBODIMENT

Figure 1:
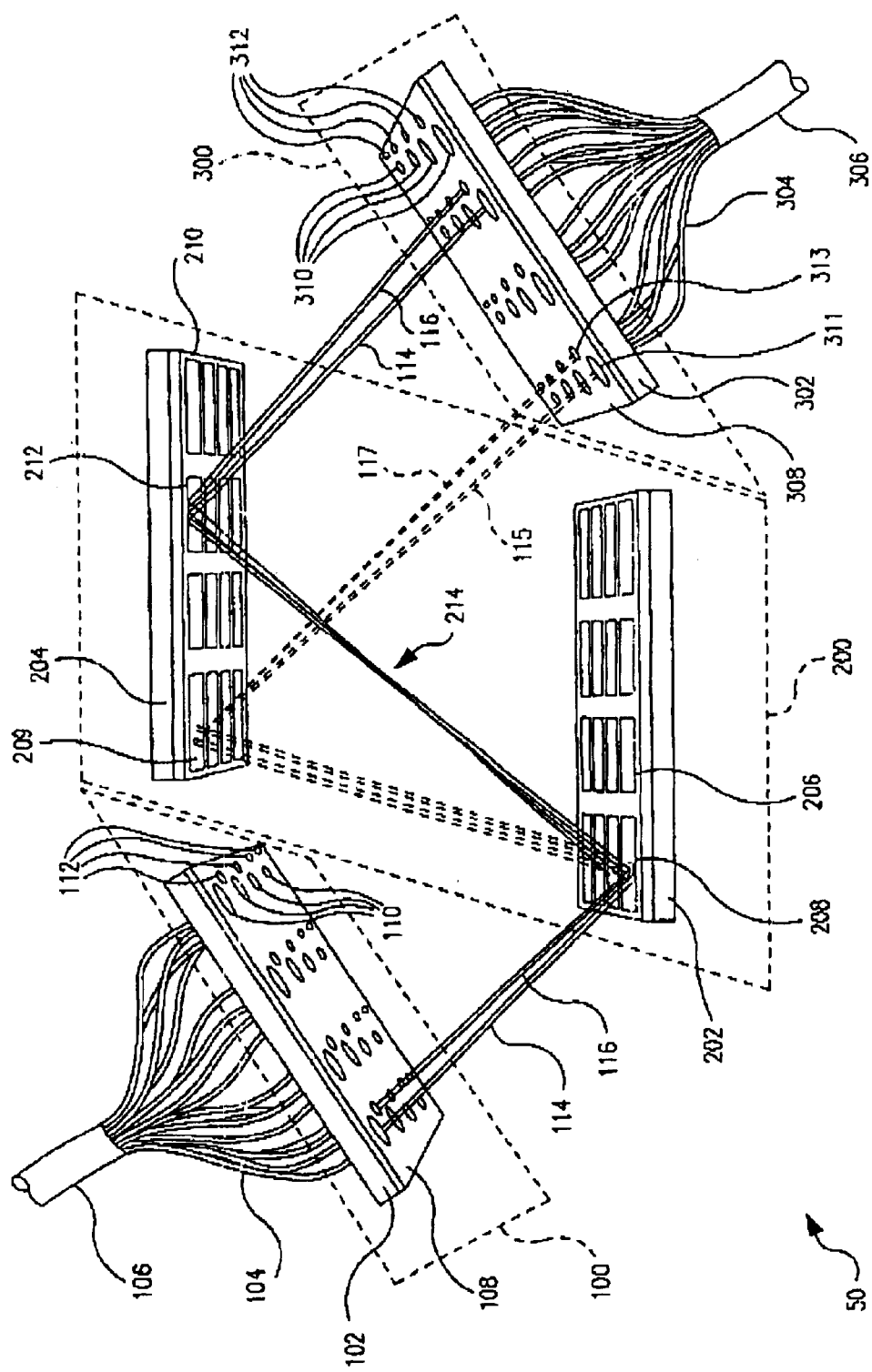
FIG. 1 is a diagrammatic representation of the Optical Cross Connect Switch of the present invention showing the three (3) basic components, including a beam generating portion, beam directing portion, and beam receiving portion.

Referring initially to FIG. 1, a diagrammatic representation of the Optical Cross Connect Switch of the present invention is shown and generally designated 50. Switch 50 includes three (3) basic components, including a beam generating portion 100, a beam directing portion 200, and a beam receiving portion 300. Beam generating portion 100 includes a substrate, or platform, 102 which receives a number of optical fibers 104 leading from a bundle 106 of optical fibers 104. A lenslet panel 108 is positioned adjacent substrate 102 and is formed with an array of communication lenslets 110 for creating a number of communications beams 114, and an array of alignment lenslets 112 for creating a number of alignment beams 116.

Beam generating portion 100 is configured with the input fibers 104 being placed in a two-dimensional array. For example, the array shown in FIG. 1 is a 4×4 array corresponding to sixteen (16) communication beams. It should be appreciated, however, that the present invention is scalable to Optical Cross Connect Switches of varying sizes, such as 16×16, 32×32, 100×100, for example. Beam directing portion 200 includes a first beam director 202 and a second beam director 204, with each director 202 and 204 having an array of beam-directing elements 206, 208, 210, and 212. In a preferred embodiment, and as will be discussed below in greater detail, these beam-directing elements include micro electromechanical systems (MEMS) devices.

Beam receiving portion 300 includes a substrate 302 which receives a number of output fibers 304 from a fiber bundle 306. Adjacent substrate 302 is a lenslet panel 308 which is formed with an array of communication lenslets 310 for receiving the communication beam 114, and an array of alignment lenslets 312 for focusing the alignment beam 116 onto a portion of the substrate 302.

In summary, the operation of the Optical Cross Connect Switch of the present invention 50 includes the generation of a communication beam 114 and its associated alignment beam 116 in the beam generation portion 100. As shown these beams 114 and 116 are directed to a beam directing element 208 on first beam director 202 of the beam directing portion 200, which are then directed to a second beam directing element 212 on second beam director 204. From second beam directing element 212, both the communication beam 114 and its associated alignment beam 116 are directed to beam receiving portion 300 where the beams 114 and 116 strike lenslets 310 and 312, respectively.

The size and configuration of the array of beam directing elements 206 and 208 on first substrate 202 corresponds to the size and configuration of the beam generating portion 100. In the present embodiment, the configuration is a 4×4 array. However, it is to be appreciated that the present invention may be scaled to any size configuration, without any significant increase in complexity of the manufacturing, alignment, or corresponding control system.

As shown, the communication beam 114 and corresponding alignment beam 116 are generated by the lowermost and leftmost lenslets 110 and 112 of beam generation portion 100. These beams 114 and 116 then propagate directly to the beam directing element 208 on first substrate 202 in beam directing portion 200. Importantly, there is a direct correlation between the particular communication beam generating lenslet 112 and beam directing element 208. In other words, each of the communication beams 114 and its associated alignment beams 116 propagate to a unique beam directing element 208.

Like the relationship between the beam generating portion 100 and first substrate 202 in beam directing portion 200, each communication lenslet 310 and its corresponding alignment beam lenslet 312 in beam receiving portion 300 correspond to a single beam directing element 212 in second substrate 204 of beam directing portion 204. Again, there is a direct correlation between the particular communication beam receiving lenslet 310 and beam directing element 212.

The selective switching of the communication beam 114 from one input fiber 104 to an output fiber 304 occurs in the selective positioning of beam directing elements 208 and 212. More specifically, because each input fiber 104 is associated with its own unique communication beam lenslet 110 which generates communication beam 114, and each output fiber 304 is associated with its own unique communication beam lenslet 310 which receives communication beam 114, then the selective switching of a communication beam between the input fiber 104 and the output fiber 304 occurs between first substrate 202 and second substrate 204 in beam directing portion 200.

As an illustration of the switching of the Optical Cross Connect Switch 50, FIG. 1 also includes a communication beam 115 (shown in dashed lines) and an alignment beam 117 (shown in dashed lines). These beams 115 and 117 represent an alternative switching position for beam directing portion 200. For example, first beam direction element 208 on first substrate 202 directs the communication beam 115 and alignment beam 117 to second beam direction element 209 on second substrate 204 which in turn directs beams 115 and 117 to communication beam lenslet 311 and alignment lenslet 313, respectively. As shown, communication and alignment lenslets 311 and 313 correspond to beam directing element 209 in second substrate 204.

Using the approach discussed above, it can be appreciated that a communication beam 114 from any input fiber 104 may be directed to any output fiber 304. More specifically, by changing the orientation of the appropriate beam directing element in the first substrate 202 corresponding to the input fiber 104, to direct the communication and alignment beams to any one of the beam directing elements in the second substrate 204 corresponding to the output fiber 304.

It can be seen from FIG. 1 that communication beam 114 and alignment beam 116 converge slightly from lenslet panel 108 such that the beams 114 and 116 intersect at location 214, approximately half of the optical beam path of the Optical Cross Connect Switch 50. The benefits of this slight convergence, and alternatives to such convergence, are discussed more fully in conjunction with FIG. 3.

Figure 2:
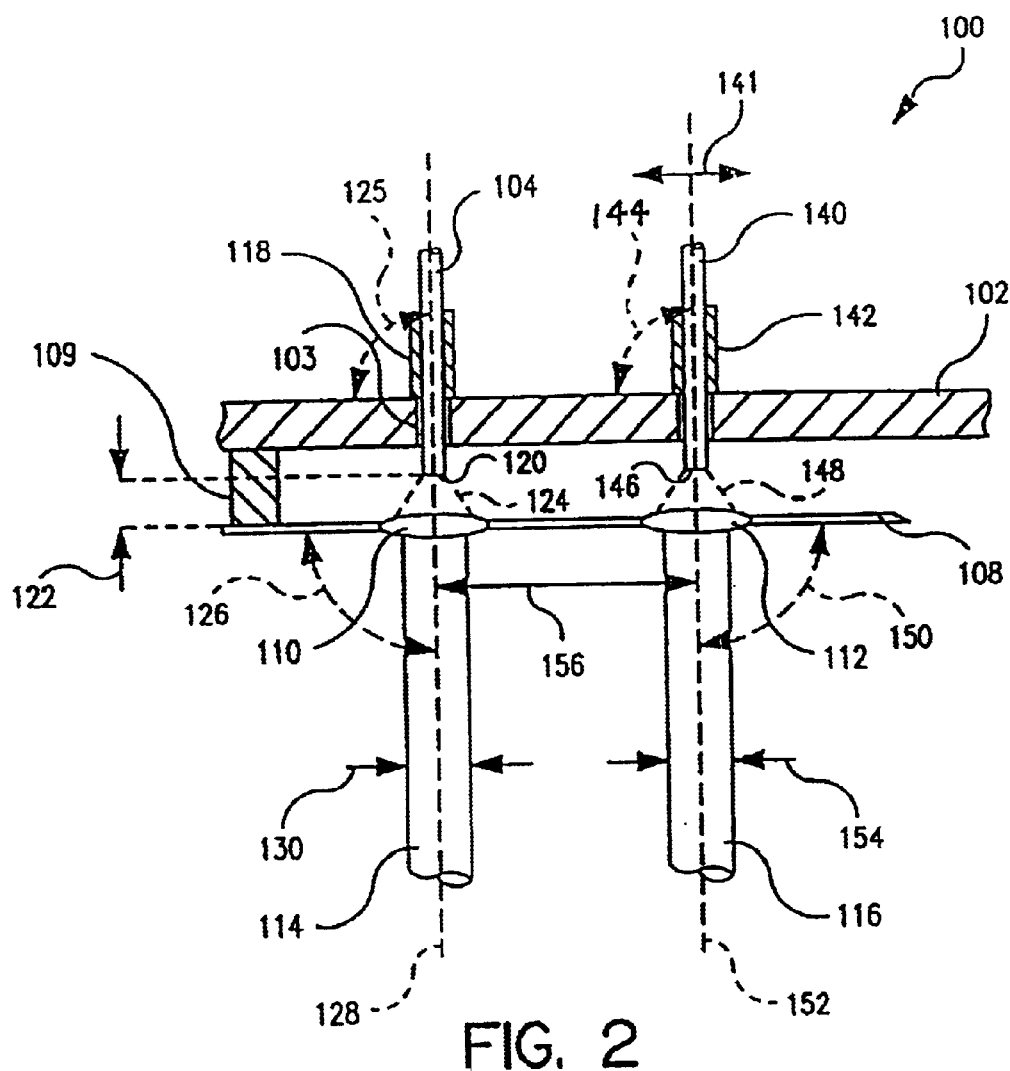
FIG. 2 is a cross-sectional view of the beam generating portion of the Optical Cross Connect Switch of the present invention showing the input fiber and its associated lenslet which generate a communication beam, and the alignment fiber and its associated lenslet which generate an alignment beam.

Referring now to FIG. 2, a cross-sectional view of the beam generating portion 100 of the Optical Cross Connect Switch 50 is shown. Beam generating portion 100 includes a substrate 102 formed with a number of fiber alignment holes 103 that receive fibers 104 from bundle 106 (not shown in this Figure). Lenslet panel 108 is substantially parallel and spaced apart from substrate 102, and help rigidly in place. In a preferred embodiment, lenslet panel 108 is secured to substrate 102 with spacers 109, but any other manner of maintaining the relative positions between substrate 102 and lenslet panel 108 may be used.

To facilitate the mounting and positioning of the fibers 104 relative to substrate 102, each fiber may be inserted into a ferrule 118. Typical ferrules have precise dimensions which are known, and thus, the location of input fiber 104 may be determined to a high degree of accuracy.

To further minimize positional errors in the locations of fibers 104, substrate 102 is made from a dimensionally stable material, including silicon, ceramic or alumina, for example. This material provides for the precision formation of fiber alignment holes 103 using laser drilling techniques. This provides a substantially smooth wall for fiber alignment hole 103 which facilitates the proper positioning of fibers 104.

As discussed above, lenslet panel 108 is equipped with an array of lenslets 110 and 112 for generating a separate and autonomous communication beam 114 and an alignment, or guidance, beam 116. As shown in FIG. 2, the end 120 of input fiber 104 extends slightly from ferrule 118 and generates a diverging light source 124 (shown in dashed lines). Lenslet 110 is separated from end 120 by a distance 122 which, in a preferred embodiment, is approximately the focal length of the lenslet 110. As a result, lenslet 110 receives substantially all light from input fiber 104 and generates communication beam 114, that is substantially collimated, and has a diameter 130.

The angle 125 between input fiber 104 and substrate 102 contributes to the communication beam angle 126. In one embodiment, this angle 125 may be ninety degrees (90°), resulting in a communication beam angle 126 of ninety degrees (90°) and propagating along optical axis 128.

Substrate 102 also receives a light source for generating alignment beam 116. In one embodiment, a light supplying fiber 140 is received in ferrule 142 and positioned at an angle 144 to substrate 102. Like the input fiber 104, fiber 140 provides a diverging light source 148 (shown in dashed lines) which strikes lenslet 112 to create alignment beam 116. The angle 150 of the optical axis 152 of alignment beam 116 may vary as a result of the angle 144 of light supplying fiber 140.

Angle 150 may also be changed by varying the placement of light supplying fiber 140 relative to lenslet 112. More specifically, by positioning light supplying fiber 140 in direction 141, the diverging light source 148 strikes lenslet 112 off of the optical axis. As is well known in the art, this off-axis position creates an angle 150 of alignment beam 116. While two separate methods for directing alignment beam 116 have been discussed, it should be appreciated that any manner of directing alignment beam 116 at an angle 150 known in the art are fully contemplated herein.

Angle 126 of communication beam 114 and angle 150 of alignment beam 116 may be varied by changing the angles 125 and 144 of the fibers 104 and 140, respectively. Thus, although beams 114 and 116 are separated by a distance 156, these beams may converge, diverge or remain parallel.

Figure 3:
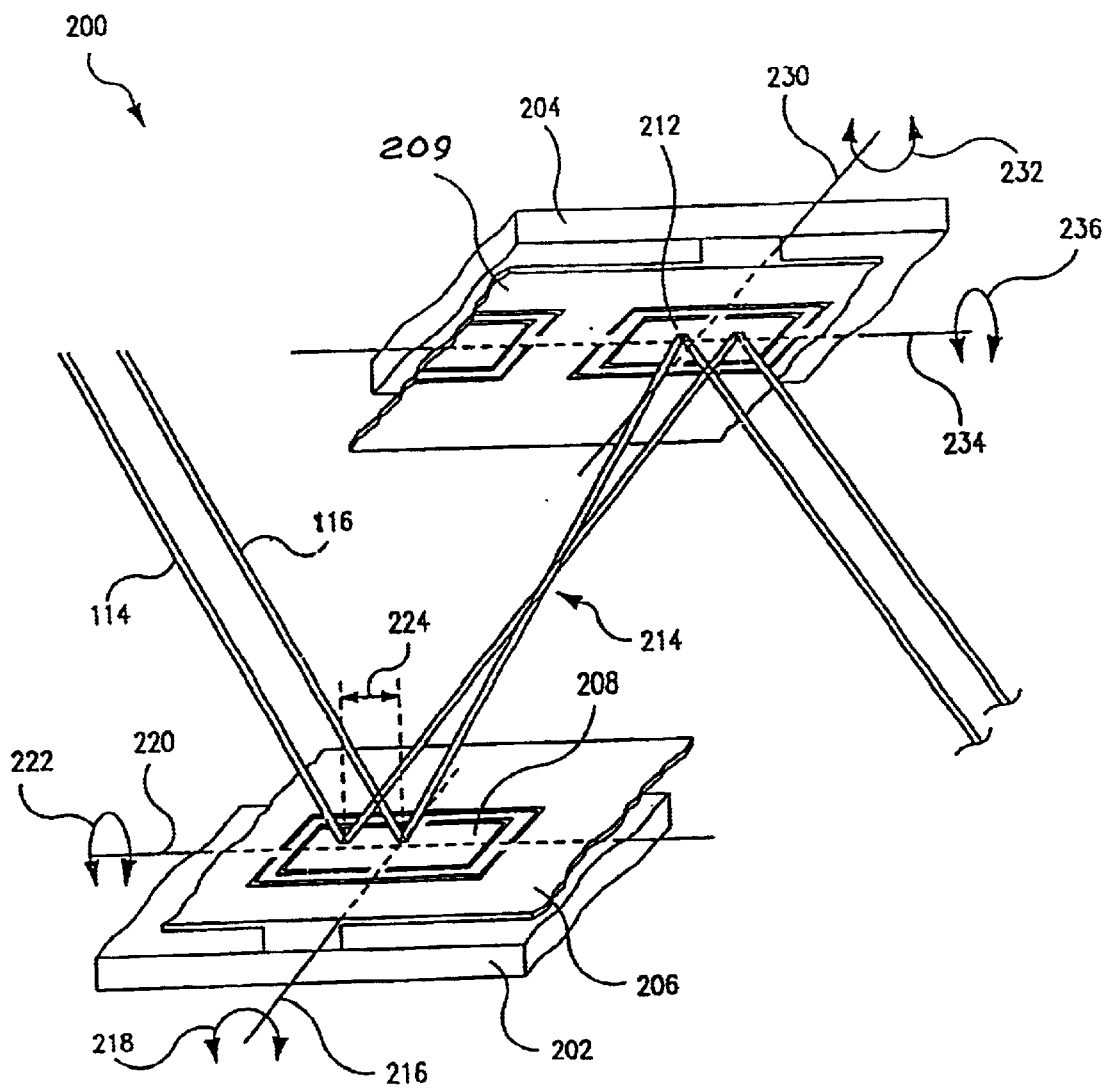
FIG. 3 is a side view of the beam directing portion of the Optical Cross Connect Switch of the present invention showing the first beam director, second beam director, and the communication beam and alignment beam as they propagate between the first beam director and second beam director.

Referring now to FIG. 3, a side view of the beam directing portion 200 of the Optical Cross Connect Switch 50 of the present invention is shown. Beam directing portion 200 includes a first beam director 202 and a second beam director 204, each formed with a number of beam directing elements 206, 208, 209, 212, for example.

In a preferred embodiment, beam directing elements include a micro electromechanical system, also referred to as a MEMS device. As is known in the art, MEMS devices are manufactured of silicon using techniques similar to those techniques for manufacturing semiconductor devices. MEMS devices can vary the orientation of its substantially planar reflective surface by varying the voltages applied to the device. Typically, the reflective surface may be rotated about two (2) axes, where the axes are orthogonal.

In FIG. 3, each of the beam directing elements 206, 208, 209, 212 are constructed to pivot about two axis. More specifically, beam directing element 208 in first beam director 202 has a first axis of rotation 216 which allows for the rotation of the element in direction 218, and a second axis of rotation 220 which allows for rotation of the element in direction 222. Similarly, beam directing element 212 in second beam director 204 has a first axis of rotation 230 which allows for rotation of the element 212 in direction 232, and a second axis of rotation 234 which allows for rotation of the element 212 in direction 236. Preferably, axes 216 and 220 are perpendicular, and axes 230 and 234 are perpendicular, however, non-perpendicular orientations are also contemplated, and fully within the scope of the present invention.

As shown in FIG. 3, communication beam 114 and alignment beam 116 propagate from beam generating portion 100 to strike beam directing element 208 within beam directing portion 200. Since beam directing element 208 may be rotated about axes 216 and 220, the communication beam 114 and alignment beam 116 may be redirected to any beam directing element on second beam director 204 simply by rotating about its axes. Thus, as discussed above in conjunction with FIG. 1, communication beam 114 and alignment beam 116 may be directed to any beam directing element on second beam director 204, which in turn directs the beams to its associated output fiber 304 in beam receiving portion 300.

Figure 4:
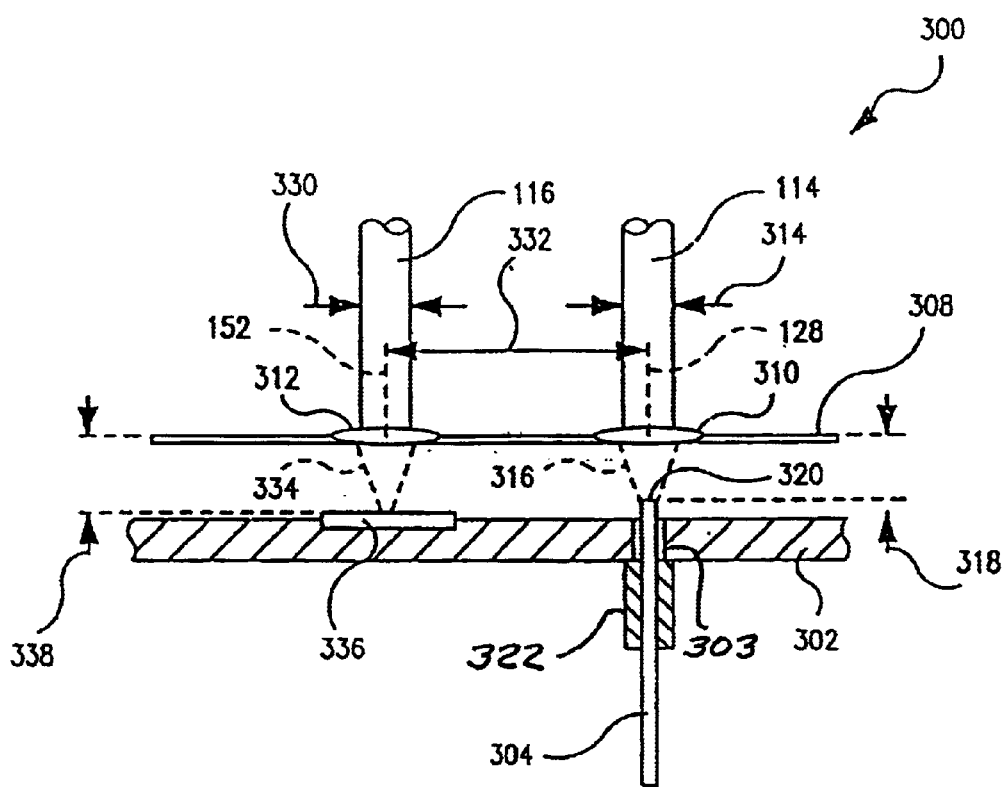
FIG. 4 is a cross-sectional view of the beam receiving portion of the Optical Cross Connect Switch of the present invention showing the communication beam which is directed to its output fiber through its associated lenslet, and the alignment beam which is directed to the alignment sensor through its associated lenslet.

Referring now to FIG. 4, a cross-sectional view of the beam receiving portion 300 of the Optical Cross Connect Switch 50 of the present invention is shown. Beam receiving portion 300 includes a substrate 302 formed with an fiber alignment hole 303 that receives an output fiber 304. Lenslet panel 308 contains lenslets 310 and 312, and which receive communication beam 114 and alignment beam 116, respectively. Like the beam generating portion 100, lenslet panel 308 is held substantially parallel to substrate 302, such as with spacers (not shown this Figure). Optical fiber 304 may be held in place through substrate 302 with a ferrule 322. The end 320 of fiber 304 is retained in place a distance 318 from lenslet 310. Preferably, distance 318 is equal to the focal length of lenslet 310 such that the communication beam 314 passes through lenslet 310 and converges onto end 320 (as shown by the light pattern 316).

Alignment beam 116 strikes lenslet 312 and is focussed into a converging light pattern 334 (shown in dashed lines) that converges onto sensor 336 on substrate 302. Preferably, the focal length of lenslet 312 is equal to distance 338 such that the alignment beam is focussed onto the surface of the sensor 336. Alternatively, the focal length of lenslet 312 may be greater or less than distance 338. In fact, lenslet 310 may be omitted entirely from the lenslet panel 308 allowing alignment beam 116 to strike sensor 336.

As shown above in conjunction with FIGS. 1, 2, 3 and 4, the communication beam 114 and alignment beam 116 converge slightly such that the two beams intersect at the approximate midpoint of the optical pathway between the beam generating portion 100 and the beam receiving portion 300. There are several advantages to this convergence. For example, by converging the communication and alignment beams 114 and 116, the distance 224 between the contact points on the beam directing element 208 is minimized. By minimizing this distance 224, the physical dimensions of each beam directing element 208 may be minimized which in turn allows for a smaller beam directing portion 200. Further, by converging the beams 114, 116 to intersect at the approximate midpoint of the optical pathway, the distance 156 between the input fiber 104 and alignment light source 140, and the distance 332 between the output fiber 304 and the center of the sensor 336, are approximately equal. This equality is useful in the initial positioning the beam directing elements, as will be discussed in greater detail below.

As an alternative to the slight convergence of beams 114 and 116, the beams may be positioned such that they are substantially parallel. By being parallel, the angle of incidence of the communication beam 114 on the beam directing elements 208 and 212 is identical to the angle of incidence of the alignment beam 116 on the same beam directing elements. Consequently, there is a direct correlation between the distance 156 between the communication beam 114 and the alignment beam 116 in the beam generation portion 100, and the distance 332 between the communication beam 114 and the alignment beam 116 in the beam receiving portion 300. In fact, in some instances, distances 156 and 332 will be the same, which provides for the initial positioning of the beam directing elements.

While FIGS. 1, 2, 3, and 4 have shown communication beam 114 and alignment beam 116 having diameters 130 and 154, respectively, it is to be appreciated that these graphical representations are for discussion purposes, and that the relative sizes and proportions shown in these figures is not to be considered as any limitation whatsoever of the present invention. Rather, it is to be appreciated that the diameters 130 and 154 of the beams 114 and 116 may be greater or smaller, and that the sizes of the lenslets 110 and 112 may also be smaller or larger. Also, distances 156 and 332 may also be smaller or larger, depending on the particular design of the present invention.

Figure 5:
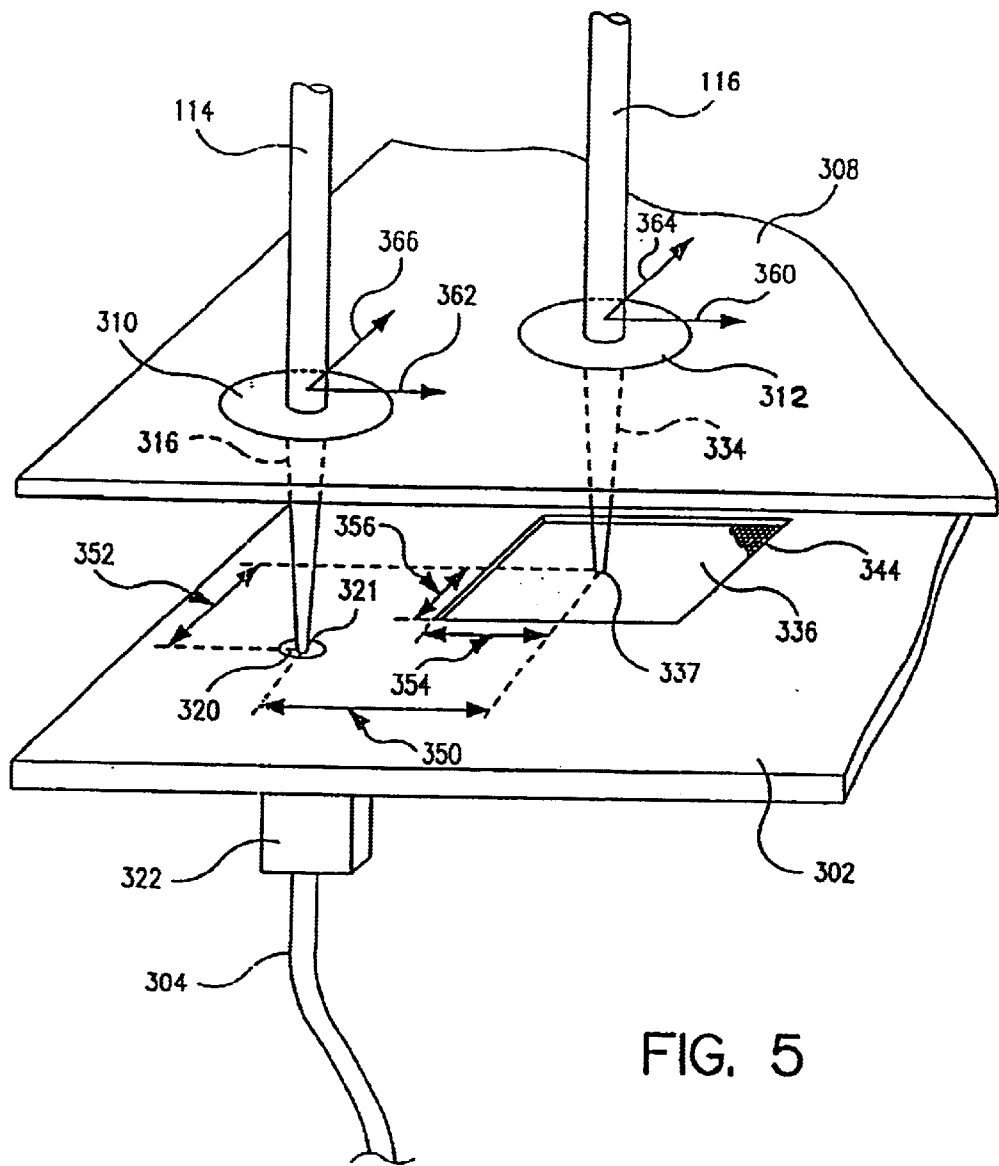
FIG. 5 is a perspective view of the beam receiving portion of the Optical Cross Connect Switch of the present invention showing the relationship between the position of the communication beam on the output fiber and the alignment beam on the alignment sensor.

Referring now to FIG. 5, a perspective view of the beam receiving portion 300 of the Optical Cross Connect Switch 50 of the present invention is shown and illustrates the relationship between the output fiber 304, the sensor 336, and the communication and alignment beams 114, 116. As mentioned above, lenslet panel 308 contains lenslet 310 which receives communication beam 114 and generates a converging pattern 316. This converging pattern 316 converges onto output fiber 304 which extends through ferrule 322 and substrate 302. Importantly, in order to maximize the light which is transmitted into output fiber 304, the converging pattern 316 must converge onto the core 321 of the output fiber 304. The diameter of the core 321 in a typical single mode (SM) optical fiber is approximately seven micrometers (7 $\mu$m). Consequently, there is very little tolerance for mis-alignment between the converging pattern 316 and the core 321 at end 320 of output fiber 304.

To provide the best possible positioning of communication beam 114 on lenslet 310 to maximize the light transmitted into output fiber 304, a position sensor 336 is provided to detect the position of alignment beam 116. Alignment beam 116 passes through lenslet 312 into focussing light pattern 334 which strikes sensor 336.

Given any combination of beam director elements from beam directors 202 and 204, the relationship between the position of the communication beam 114 on the output fiber 304 and the alignment beam 116 on the alignment sensor 336 is known. For example, the focussing light pattern 316 from the communication beam 114 strikes the end 120 of fiber 104 at a location offset from where the focusing light pattern 334 of the alignment beam 116 strikes the sensor 336. This offset can be characterized is a combination of an X-offset 350 and a Y-offset 352.

The particular offset values 350 and 352 for each combination of beam directing elements, for example, beam directing elements 208 and 212, are known. These values may be determined mathematically using the particular physical components of the system 50, including the convergence angles 126 and 150 of the communication beam 114 and the alignment beam 116, the rotational position of the beam directing elements in directions 218, 222, 232, and 236, and the optical path length. Alternatively, the offset values may be measured by constructing or modeling the device 50 and measuring the offset values 350 and 352 for each combination of beam director elements.

Because the offset values 350 and 352 are known, the focusing light pattern 316 may be precisely positioned on core 321 of fiber 104 by adjusting the rotational positions of the beam director elements 208 and 212 to position the alignment beam at the precise location 337 identified by distance 354 and 356 on sensor 336. Once the alignment beam 116 is properly positioned at location 337 within sensor 336 according to the particular offset values 350 and 352, the converging light pattern 334 from communication beam 114 will likewise be properly positioned directly on core 321 on the end 320 of fiber 304.

Sensor 336 is a light-sensitive sensor which provides an output signal corresponding to the location where the alignment beam focusses on the sensor. A variety of suitable sensors could be fabricated using known technologies, including those technologies used in manufacturing an array of position sensitive diodes (PSD), a charge coupled device (CCD) panel, and a light sensitive CMOS array.

The PSD sensor provides a pair of analog voltages which correspond to the location where a light beam strikes the sensor. In the present embodiment, sensor 336 would provide two (2) separate analog voltages corresponding to the location 337 on sensor 336 where focussed light beam 336 strikes the sensor, with a first analog voltage corresponding to the distance 354, and a second analog voltage corresponding to the distance 356. These analog voltages may be measured to determine whether the converging light pattern 334 of alignment beam 116 is in the proper position given the particular beam directors 208 and 209 which are being used.

In the event the converging light pattern 334 strikes sensor 336 in a location which does not correspond to the particular offset distances 354 and 356, then the beam directors may be adjusted to further position the communication and alignment beams 114 and 116. For example, if distance 354 corresponding to location 337 is too small, then the beam directors may be adjusted to move both the communication beam 114 and alignment beam 116 in directions 362 and 360, respectively. Similarly, if distance 356 corresponding to location 337 is too small, then beam directors may be adjusted to move both the communication beam 114 and alignment beam 116 in directions 366 and 364, respectively. Thus, using the known relationship between the position of the communication beam and its corresponding alignment beam, the communication beam may be focussed very precisely onto the core 321 of the output fiber 304.

A CMOS pixel array may be used to precisely locate the converging beam 334 on sensor 36. Instead of providing an analog voltage corresponding to the location 337, a CMOS array provides a two (2) dimensional array of pixels 344 which precisely image the converging light beam 334. This image may be analyzed to identify distances 354 and 356 to determine the location of alignment beam 116. Then, as described above, if distances 354 and 356 do not correspond to the position 337 where converging light beam 316 from communication beam 114 focusses onto core 321 of output fiber 304, beam directors may be adjusted in order to move communication beam 114 and corresponding alignment beam 116 in directions 362 and 360, and 366 and 364, or a combination of those directions.

While directions 360, 362, 364 and 366 have been depicted in FIG. 5 as positive, it is to be appreciated that these directions are merely exemplary of movement of the communication beam 114 and corresponding alignment beam 116 on lenslets 310 and 312. This movement may be any direction, thus accommodating any location 337 where converging beam 334 strikes sensor 336.

In a preferred embodiment, the location 337 of the alignment beam 334 can be determined in one of several manners. For example, a standard centroid calculation may be used. In this embodiment, the sensor consists of an array of light sensitive pixels and the location of the "spot" is calculated by dividing the weighted sum of the measured pixel intensities by the total measured intensity of the beam. This, in effect, computes an intensity center of gravity which corresponds to the location of the center of the beam. Other, more advanced techniques for determining the location of the beam may also be used.

Figure 6:
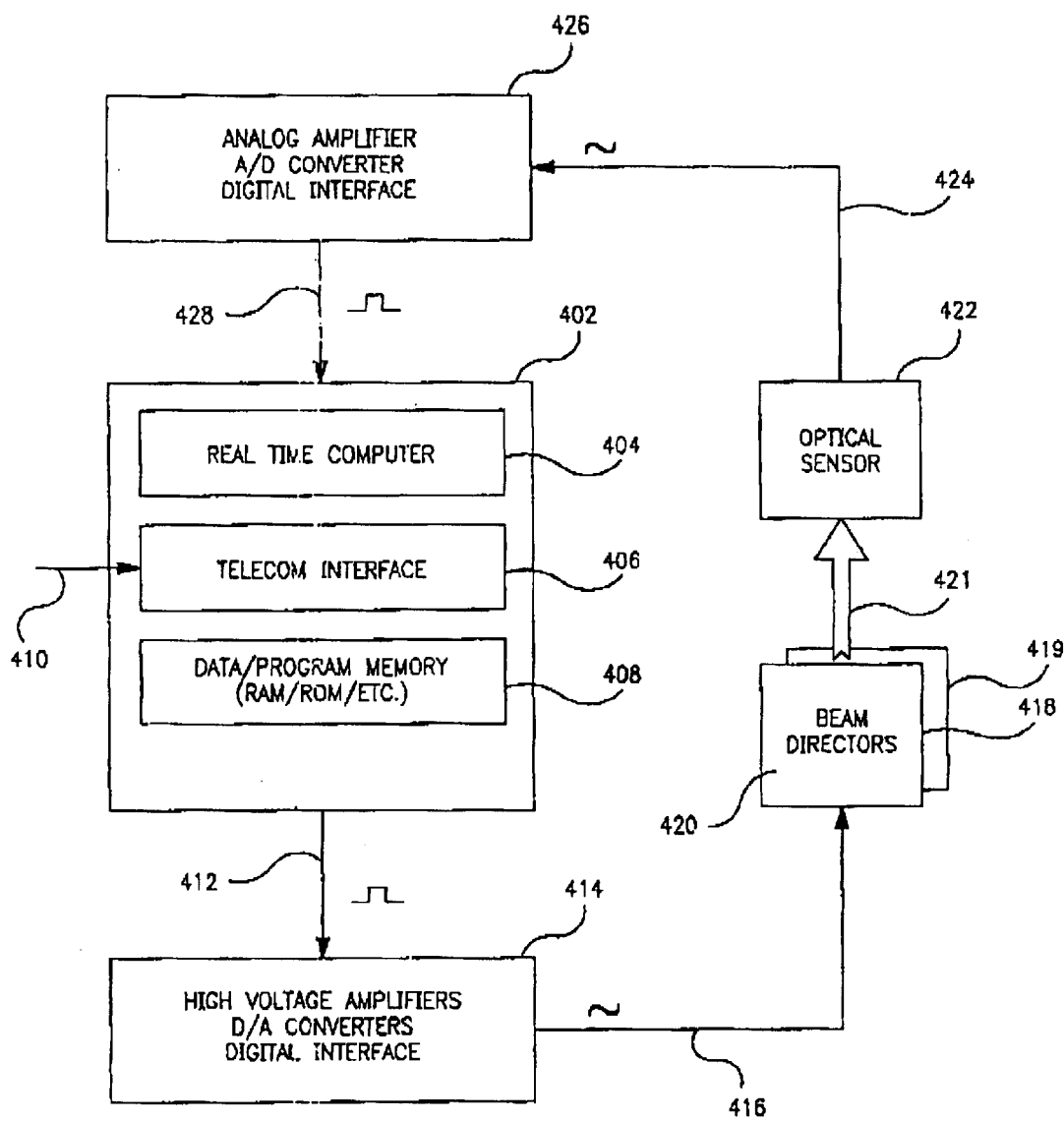
FIG. 6 is a block diagram of the control system of the Optical Cross Connect Switch of the present invention showing the computer control of the beam directing portion and its associated optical feedback.

Referring now to FIG. 6, a block diagram of the control system of the Optical Cross Connect Switch of the present invention is shown and generally designated 400. Control system 400 includes a computer 402 containing a real time computer 404, a telecommunications interface 406, and a digital storage device 408.

Computer 402 is a system capable of making the computations required to implement a closed-loop feedback control system. It may be comprised of analog or digital electronics, or may be implemented with optical computations units. In a preferred embodiment, the computer consists of digital electronics with at least one component capable of computation, and with at least three digital interfaces. The first interface would be capable of receiving the digitized optical feedback signals, the second interface would be capable of transmitting command signals to the analog electronic driver required for actuation of beam directors 202 and 204. And the third interface would be capable of receiving the network configuration command from an external source and transmitting the state of the optical switch. Other interfaces may be required for certain implementations.

In a preferred embodiment, the digital computation electronics could consist of one or more general purpose processors, such as a commercial available digital signal processor (DSP) or other central processing unit (CPU), or might be on e or more application specific integrated circuits (ASIC) design specifically for this task. The digital interfaces could consist of any one of a large variety of parallel or serial links and may conform to some industry standards, or may be custom for a particular implementation.

Telecommunication interface 406 provides an electronic interface between computer 402 and a telecommunication exchange via interconnect 410. In a typical environment incorporating the Optical Cross Connect System 50 of the present invention, interconnect 410 will receive switching information, including the input fibers 104 and the output fibers 304, which are to be optically coupled. A standard format for receiving this information may be established by a particular telecommunications network, but it is to be appreciated that regardless of the particular protocol, this information will contain particular switch configurations which may be implemented by the present invention.

Digital storage device 408 may include both temporary and permanent digital memory media. For example, digital storage device 408 may include random access memory (RAM) for manipulation of data, and programmable read only memory (PROM) for storage of programed computer sequence steps, and may include tables of offset values.

Computer 402 is electrically connected to digital interface 414 via electrical connection 416. Digital interface 414 contains high voltage amplifiers, and digital to analog converters (DACs) that convert digital information from computer 402 to the analog signals necessary to control the beam director elements (208 and 212 in FIG. 3), such as MEMS devices. Digital interface 414 also transmits and receives any necessary digital data between computer 402 and beam directors 418.

Beam directors 418 and 419 receive the electronic signals from interface 414 which drive each of the beam directing elements 420 to their particular rotational position in order to direct communication beam 114 from one input fiber 104 to its intended output fiber 304. In order to ensure that the beam directing elements 420 are properly positioned, optical sensor 422 measures the position of the alignment beam, depicted in FIG. 6 as optical feedback 421. Specifically, optical sensor 422 measures the position of the alignment beam 116 within the sensor area 336, and provides that position information electronically via electrical connection 424 to analog interface 426.

Analog interface 426 contains analog signal conditioning components, including analog amplifiers and analog to digital converters (ADCs), which receive the analog signals from optical sensor 422 and generate digital signals for transmission along electrical connection 428 to computer 402.

Computer 402 receives the electronic information from sensor 422 regarding the position of the alignment beam, and compares this position to the position contained in the memory 408 to determine whether the beam director elements 420 in beam directors 418 and 419 are properly positioned. If there is a difference between the position of the alignment beam measured by sensor 422 and the position data contained in memory 408, computer 402 adjusts the electronic signals sent to digital interface 414 to modify the rotational position of beam director elements 420 and re-position the alignment beam within the sensor. The position of the alignment beam is then once again measured by optical sensor 422, and the adjustment to the rotational positions of the beam directing elements is repeated if necessary. By properly positioning the alignment beam in this manner, the proper position of the communication beam is achieved without any interference with or measurement of the communication beam itself.

Operation of the Invention

In operation, the Optical Cross Connect Switch 50 of the present invention transmits an optical signal from an input fiber 104 to an output fiber 304. The operation of a preferred embodiment of the present invention is perhaps best understood with reference to FIGS. 1, 3, and 5.

As depicted in FIG. 1, the guidance and control system incorporates a single un-modulated DC optical guidance beam for each input fiber. The communications beam and its companion guidance beam both pass through a micro-lens array, labeled 100 in the figure, which transform the diverging beams into nearly collimated beams. The microlens array has a separate micro lens for each communication beam 110, and a separate one for each guidance beam 112. After passing through the micro lens array, the communication and guidance beam pair are nearly parallel, but are purposefully misaligned slightly so that the beams cross near the center of the free space optical path. After reflecting from the appropriate elements of the two beam steering mirror arrays 200, the communication-guidance beam pair encounter a second micro lens array which focusses the two beams. The communication beam is focussed onto a single output fiber and the guidance beam is focussed on a CMOS sensor.

Operation of the device proceeds as follows. Upon system startup, each beam steering element is positioned in its nominal flat position parallel with the plan of the gird of mirror elements as defied by element 202 in FIG. 1. At this point, the communications-alignment beam pairs are positioned without optical feedback, and the switch is configured such that each alignment beam falls on the sensor corresponding to the nominal straight path or non-switched output fiber. Closed-loop feedback is then initiated on all of the communications-guidance beam pairs, and residual open-loop pointing errors in the beam steering elements are removed using a servo control loop.

Reconfiguration of the input-output mapping of fibers, the switch fabric, is accomplished as follows. Upon receipt of a reconfiguration command, the beam steering mirrors of the affected channels immediately perform an open loop step, moving from their current position to a new position appropriate for completing the commanded reconfiguration. During the open loop step, control feedback is terminated on the affected channels. When the beam steering element are near their new positions, the guidance beam falls on the portion of the sensor correspond to the new output fiber indicated by the configuration command. At this point, closed loop servo control is re-initiated and the new connection is finalized. During the open loop step, the guidance beam for the repositioning channels may be switched off in order to eliminate any contamination of the servo feedback signal of non-switched channels by the guidance beams of the switching channels. Alternatively, the control algorithm can be designed to ignore any effects of stray guidance light from the switching channels, which may arise while scanning those beams during their open-loop step, and which might reach the sensors of those channels not switching.

In a preferred embodiment, the servo loop may operate only on the mirror elements in the second mirror array. In alternative embodiments, the servo loop may operate on the mirror elements in the first mirror array, the second mirror array, or both the first and second mirror arrays.

In one embodiment, the calibration of each of the mirror elements in the first array is sufficiently accurate that it is possible to position these elements with an open loop signal such that substantially all of the optical energy of the alignment and communications beams corresponding to each element will fall on the intended target mirror element in the second beam director array.

The open loop pointing of the beam directing mirror elements is calibrated at manufacture, and periodically throughout the lifetime of the device, insuring that the open loop pointing accuracy is high. Also, the open loop pointing accuracy of the mirrors in the first array needs to be no better than a few percent of the full stroke since small errors in position of the first elements are, in effect compensated by the closed loop servo control system operating on elements in the second mirror array. This initial open loop pointing, in combination of the feedback control of the second beam directing elements accurately positions the communication beam onto the center of the output fiber.

Alternative Embodiments

Figure 7:
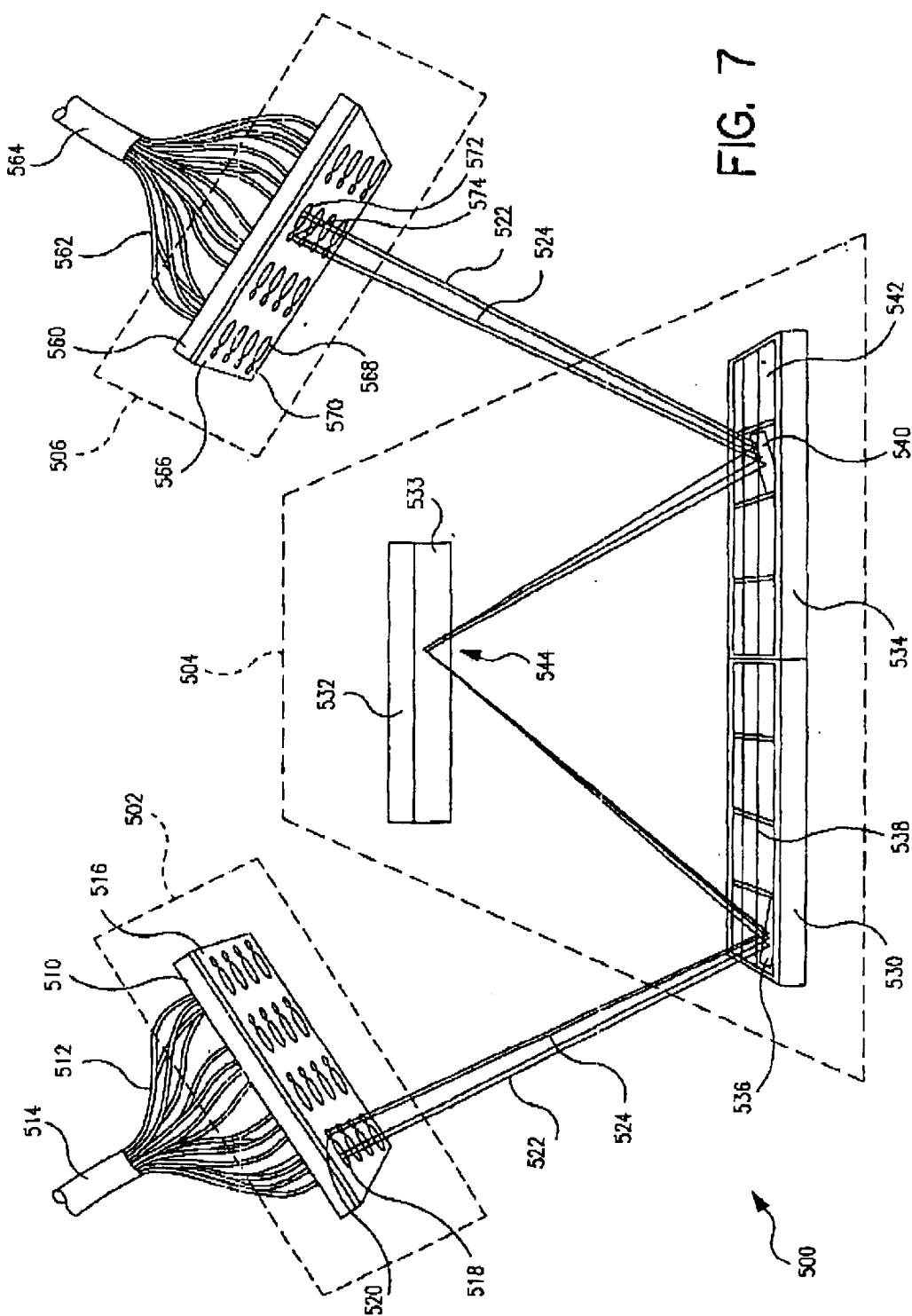
FIG. 7 is a diagrammatic representation of an alternative embodiment of the Optical Cross Connect Switch of the present invention showing the three (3) basic components, including a beam generating portion, beam directing portion, and beam receiving portion.

Referring now to FIG. 7, a diagrammatic representation of an alternative embodiment of the Optical Cross Connect Switch of the present invention is shown and generally designated 500. Switch 500 includes a beam generating portion 502, a beam directing portion 504, and a beam receiving portion 506. Beam generating portion 502 is an equivalent to beam generating portion 100 and beam receiving portion 506 is an equivalent to beam receiving portion 300 shown, as shown in FIG. 1.

Beam directing portion 504 includes a first beam director 530 and a second beam director 534, with each director 530 and 534 having an array of beam-directing elements 536, 538, 540 and 542. In a preferred embodiment, and as will be discussed below in greater detail, these beam-directing elements may include micro electromechanical systems (MEMS) devices, or other beam directing elements known in the art. Beam directing portion 504 also includes a reflector 532 which has a reflective surface 533.

As shown in FIG. 7, a communication beam 522 and an alignment beam 524 are generated in beam generating portion 502 and propagate into beam directing portion 504, striking a beam directing element 536 in first beam director 530 corresponding to the lenslets 518 and 520. Beam directing element 536 re-directs communication beam 522 and alignment beam 524 to a beam directing element in second beam director 534, such as beam directing element 540. In the present embodiment, the re-directing of communication and alignment beams 522 and 524 is accomplished by reflecting these beams from reflector 532. From beam director element 540, the communication and alignment beams 522 and 524 are directed to lenslets 572 and 574.

As with Optical Cross Connect Switch 50 shown in FIG. 1, the communication beam 522 and alignment beam 524 may converge, and may intersect midway along the optical pathway through switch 500. In the present embodiment, such intersection may occur at approximately location 544.

Figure 8:
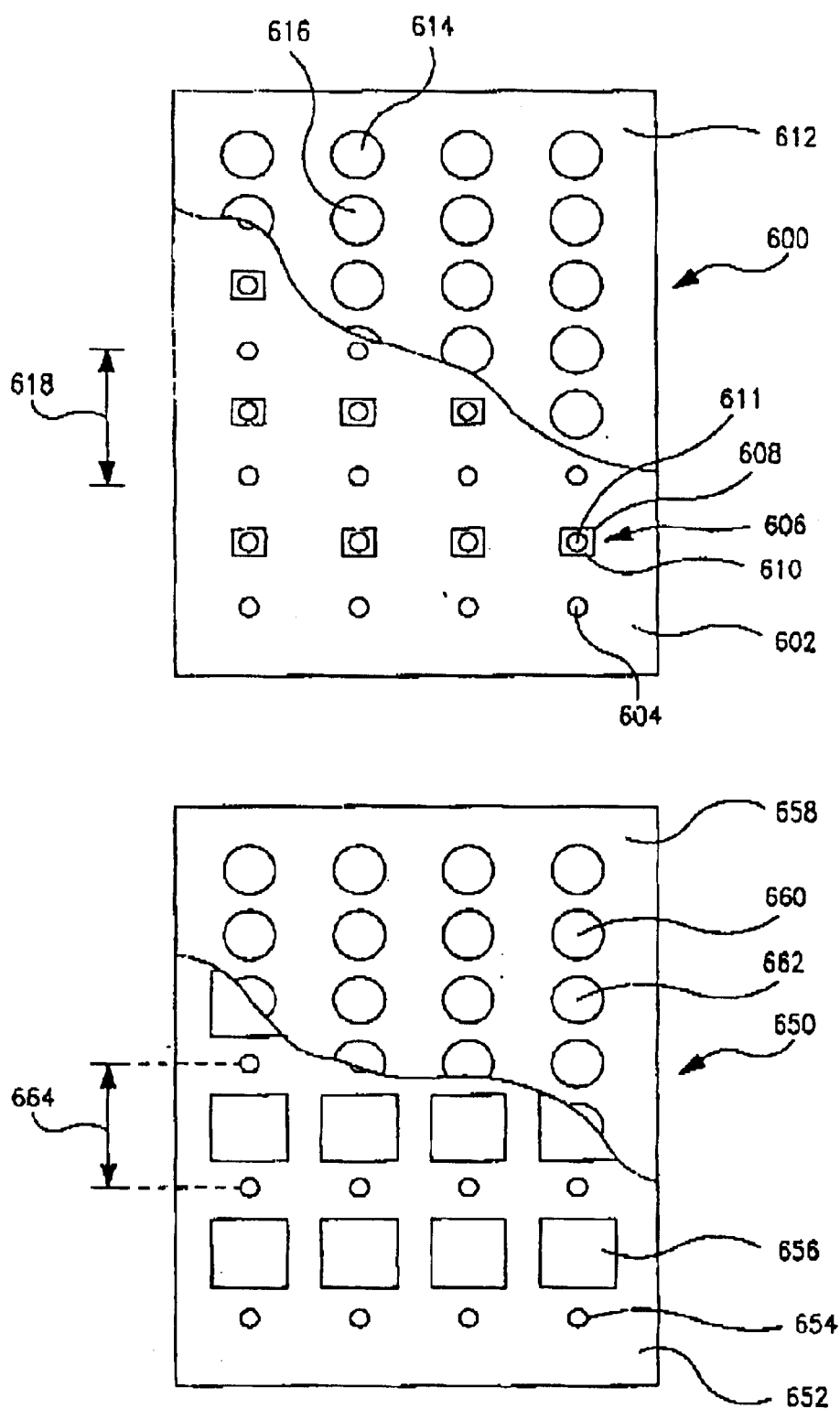
FIG. 8 is a plan view of an alternative architecture for the beam generating portion and beam receiving portion of the Optical Cross Connect Switch of the present invention with parts cut away for clarity.
Figure 9:
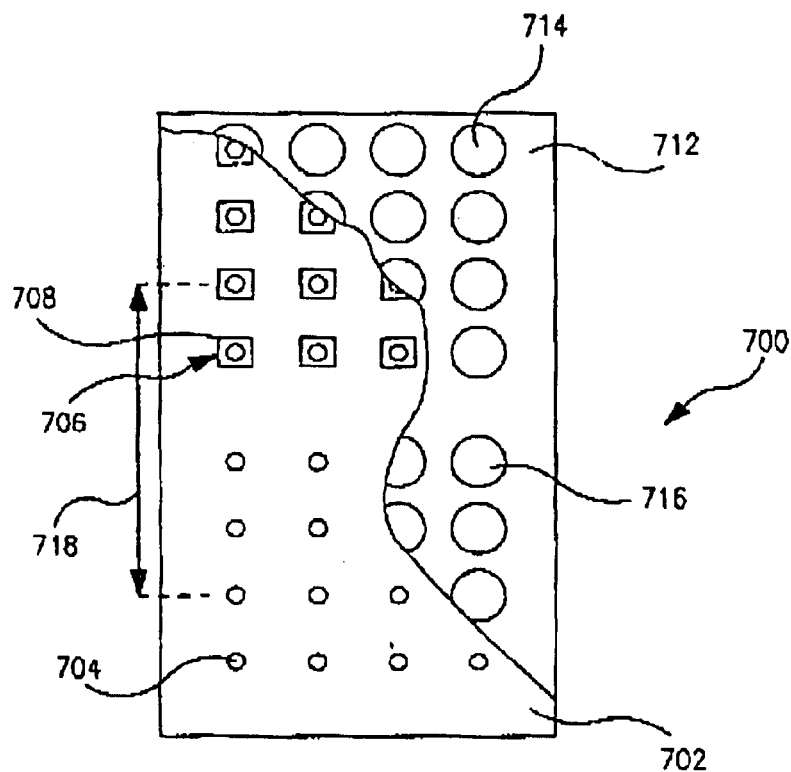
FIG. 9 is a plan view of another alternative architecture for the beam generating portion and beam receiving portion of the Optical Cross Connect Switch of the present invention with parts cut away for clarity.
Figure 9:
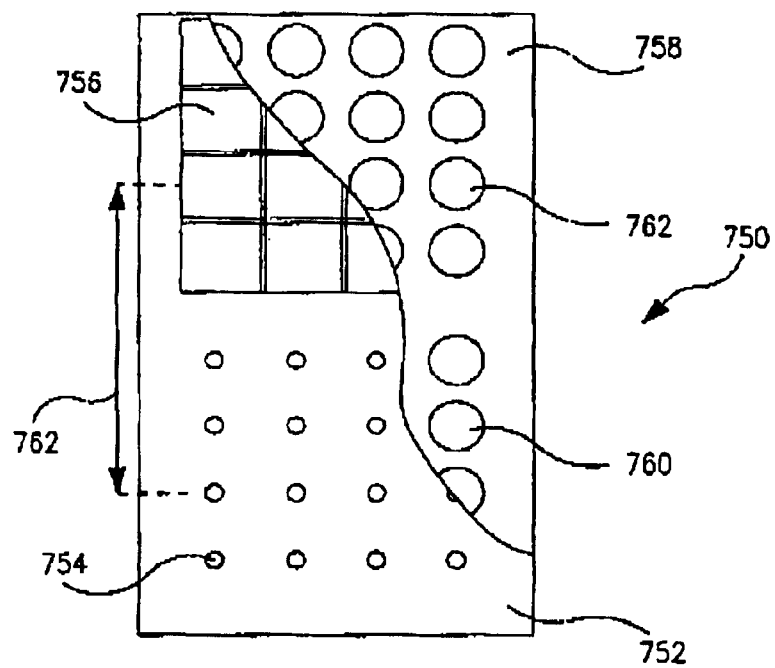

Referring now to FIGS. 8 and 9, alternative architectures for the beam generating portion 100 and beam receiving portion 200 of the Optical Cross Connect Switch 50 of the present invention are shown. Like beam generating portion 100, beam generating portion 600 generates a communication beam and an alignment beam which propagate through the beam directing portion 200. Further, like beam receiving portion 300, beam receiving portion 650 receives a communication beam into an output fiber, and an alignment beam into a position sensor.

Referring initially to FIG. 8, an alternative embodiment beam generating portion 600 is shown which includes a substrate 602 formed with an array of fiber alignment holes 604 for receiving an optical fiber and associated ferrule (not shown this Figure).

An alignment beam generator 606 is either mounted to the surface of, or made integral to, substrate 602, and may include an optical fiber with an associated ferrule as described in conjunction with FIG. 2. Alternatively, alignment beam generator may include a light emitting diode (LED) 608 which emits light that is directed away from substrate 602. This light direction may be accomplished by providing a mask 610 over LED 608. In a preferred embodiment, mask 610 is formed with a small hole 611 which allows only a small portion of the light generated by LED 608 to pass through the mask in the form of a diverging light beam.

The diverging light beam from LED 608 passes through a lenslet, on panel 612, such as lenslet 614, to create an alignment beam (not shown this Figure). Light emitted from the input fiber in fiber alignment hole 604 passes through a lenslet, such as lenslet 616, on panel 612 to create a communication beam (not shown this Figure).

Beam receiving portion 650 includes a substrate 652 which is formed with an array of fiber alignment holes 654 for receiving an output fiber supported by its associated ferrule (not shown this Figure). Substrate 652 is also formed with an array of sensors 656 which may be formed integral to, or attached to the surface of, substrate 652. Panel 658 includes an array of lenslets 660 which are positioned above fiber alignment holes 654 containing output fibers, and an array of lenslets 662 which are positioned above sensors 656.

As shown in FIG. 8, the distance 618 between fiber alignment holes 604 which contain the input fibers and their associated ferrules, is substantially equal to distance 664 between fiber alignment holes 654 which contain output fibers and their associated ferrules. This spacing provides for a consistent spacing between output fibers and sensors 656, and facilitates the directing of the communication and alignment beams through the beam directing portion 300.

FIG. 9 is a plan view of another alternative architecture for the beam generating portion 100 and beam receiving portion 300 of the Optical Cross Connect Switch 650 of the present invention. Beam generating portion 700 generates a communication beam and an alignment beam which propagate through the beam directing portion 200. Further, like beam receiving portion 300, beam receiving portion 750 receives a communication beam into an output fiber, and an alignment beam into a position sensor.

Beam generating portion 700 includes an alignment beam generator 706 is either mounted to the surface of, or made integral to, substrate 702, and includes a light emitting diode (LED) 708 which emits light that is directed away from substrate 702. The diverging light beam from LED 708 passes through a lenslet, on panel 712, such as lenslet 714, to create an alignment beam (not shown this Figure). Light emitted from the input fiber in fiber alignment hole 704 passes through a lenslet, such as lenslet 716, on panel 712 to create a communication beam (not shown this Figure).

Beam receiving portion 750 includes a substrate 752 which is formed with an array of fiber alignment holes 754 for receiving an output fiber supported by its associated ferrule (not shown this Figure). Substrate 752 is also formed with an array of sensors 756 which may be formed integral to, or attached to the surface of, substrate 752. Panel 758 includes an array of lenslets 760 which are positioned above fiber alignment holes 754 containing output fibers, and an array of lenslets 762 which are positioned above sensors 756.

Figure 10:
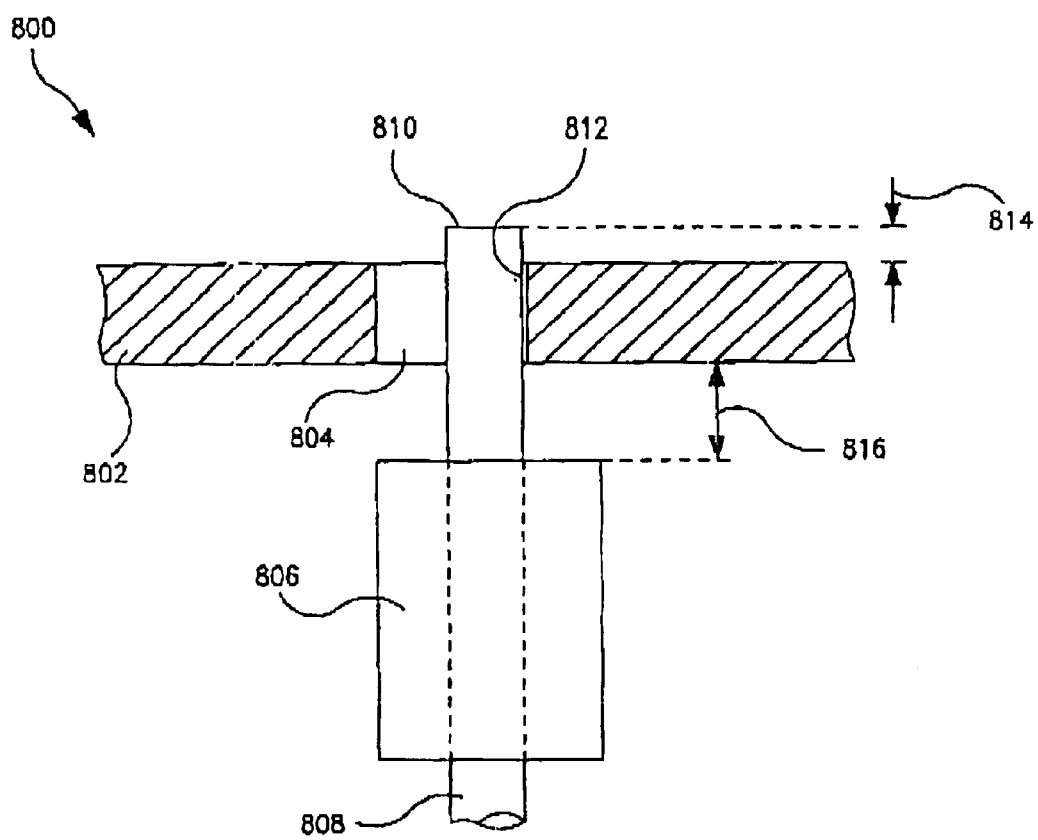
FIG. 10 is a partial cross-sectional view of the beam receiving portion of the Optical Cross Connect Switch of the present invention showing the positioning of the output fiber through a fiber alignment hole in the substrate.

Referring now to FIG. 10, a partial cross-sectional view of the beam receiving portion of the Optical Cross Connect Switch of the present invention is shown and generally designated 800. From this view, the substrate 802 is shown with an fiber alignment hole 804. Spaced behind substrate 802 is a ferrule 806 which receives an optical fiber 808 having an end 810 which extends through substrate 802 and contacts inner wall 812 of fiber alignment hole 804. Even though ferrule 806 may be positioned away from substrate 802 a distance 816, the contact between end 810 of fiber 808 and inner wall 812 of fiber alignment hole 804 provides a positive position force on fiber 810 which stabilizes the position of the fiber 804 so that a communication beam may be focussed onto end 810. This same construction may be implemented in a beam generating portion to provide the proper positioning of an input fiber, such as fiber 104, for the generation of communication or alignment beams 114 or 116.

Figure 11:
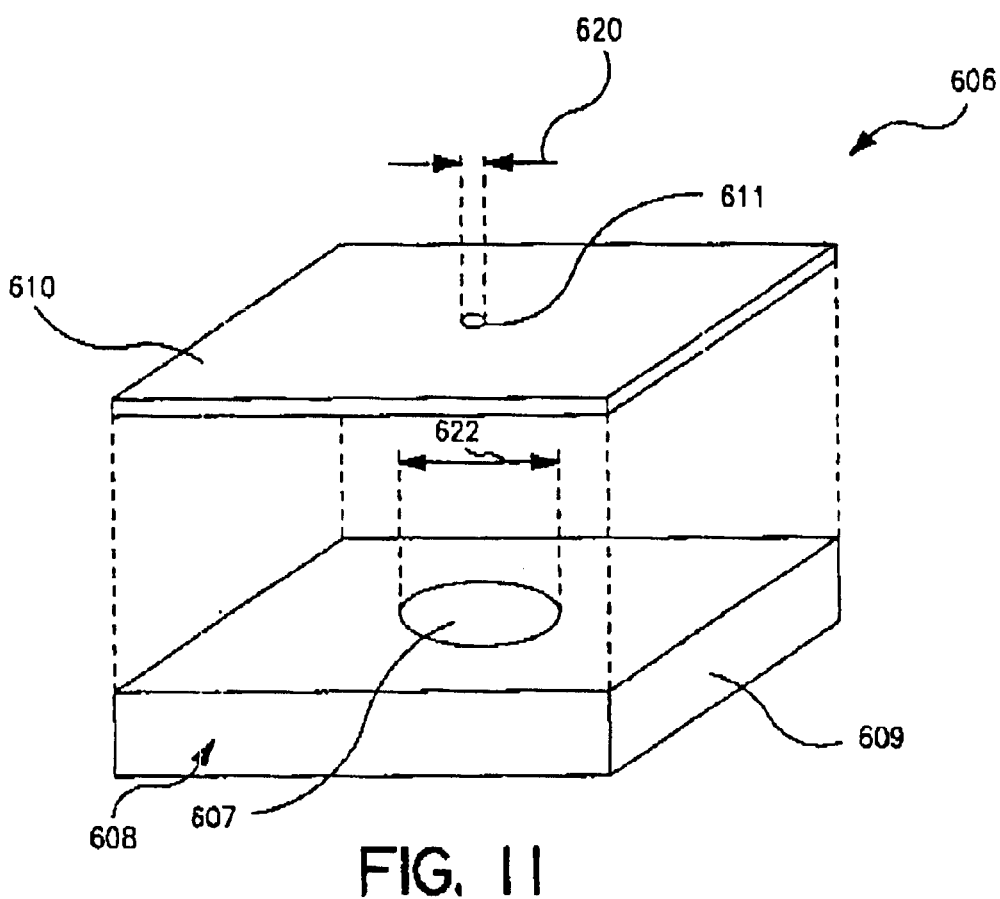
FIG. 11 is an exploded view of an alignment beam light source including a light emitting diode (LED) and a mask which allows only a portion of the light generated from the LED to be emitted for creating an alignment beam.
Figure 12:
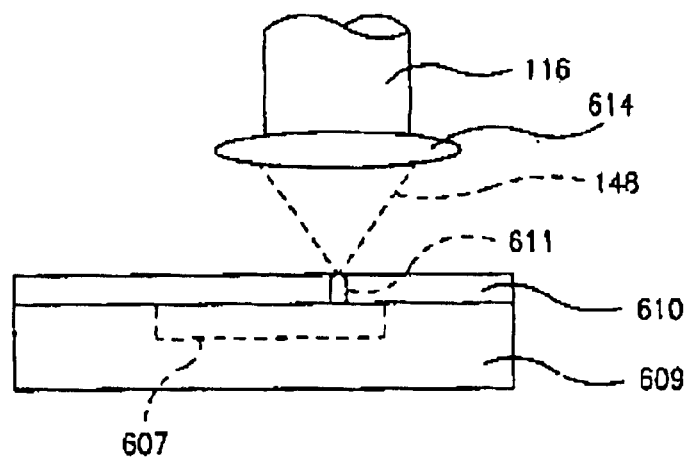
FIG. 12 is a side view of the alignment beam light source of FIG. 11, showing the creation of a diverging light beam.

Referring now to FIGS. 11 and 12, an exploded and side view of a light source for generating an alignment beam 116 are shown and generally designated 606. Alignment beam generator 606 includes a base 609 containing an LED 608 having a light emitting area 607. Mask 610 is formed with a small hole 611 having a diameter 620 which allows only a small portion of the light generated by LED 608 to propagate from the mask in the form of a diverging light beam 148. Diameter 620 is much less than diameter 622 of light emitting area 607 which provides for a strong, yet localized, source of light for creating diverging light beam 148. As diverging light beam 148 expands, it strikes lenslet 614 to create alignment beam 116 (also shown in FIG. 1).

While there have been shown what are presently considered to be preferred embodiments of the present invention, it will be apparent to those skilled in the art that various changes and modifications can be made herein without departing from the scope and spirit of the invention.

What is claimed is:

1. An optical cross connect switch, comprising:
   a beam generating portion receiving an optical input fiber having an end, and providing an optical signal from said end, and having a means for generating a substantially collimated communication beam containing said optical signal, and a means for generating a substantially collimated companion alignment beam, wherein said communication beam and said companion alignment beam propagate away from said beam generating portion in closely spaced, substantially parallel paths;
   a beam receiving portion receiving a plurality of optical output fibers, each said optical output fiber having a core and an associated position sensor adjacent and in a known positional relationship to said core;
   a beam directing portion for receiving said communication beam and said companion alignment beam from said beam generating portion, and a means for directing said communication beam to one optical output fiber of said plurality of optical output fibers, and said companion alignment beam to said associated position sensor wherein said companion alignment beam strikes said position sensor at a location and said sensor generates an electrical signal corresponding to said location; and
   a means for controlling said means for directing said communication beam, said means for controlling receiving said electrical signal and adjusting said means for directing said communication beam in response to said electrical signal to position said communication beam on said core.

2. The optical cross connect switch of claim 1, wherein said companion alignment beam is unmodulated.

3. The optical cross connect switch of claim 1, wherein said beam generating portion further comprises a substrate formed with a fiber alignment hole for receiving said optical input fiber.

4. The optical cross connect switch of claim 1, wherein said means for generating a substantially collimated communication beam includes a lenslet positioned a distance from said end of said optical fiber wherein said optical signal passes through said lenslet.

5. The optical cross connect switch of claim 4, wherein said lenslet is formed with a focal distance, and said distance from said end of said optical fiber is approximately equal to said focal distance.

6. The optical cross connect switch of claim 1, wherein said beam receiving portion further comprises a substrate formed with a fiber alignment hole for receiving each fiber of said plurality of fibers.

7. The optical cross connect switch of claim 1, wherein said beam directing portion further comprises a first beam director formed with a steerable beam directing element having a reflective surface, and a second beam director formed with a plurality of steerable beam directing elements having a reflective surface, said communication beam striking said reflective surface of said first beam director for reflection to one of said plurality of beam directing elements in said second beam director for reflection to said core of one said output fiber, and said companion alignment beam striking said reflective surface of said first beam director for reflection to said one of said plurality of beam directing elements in said second beam director for reflection to said associated position sensor.

8. The optical cross connect switch of claim 1, wherein said means for controlling said means for directing further comprises a control system comprising a processor having an input for receiving switching information, and an output generating a control signal for said means for directing said communication beam to said core of said output fiber.

9. The optical cross connect switch of claim 8, wherein said control system receives said electrical signal corresponding to said location and determines an optical feedback position error, and generates a second control signal for said means for directing said communication beam to said core of said output fiber.

10. The optical cross connect switch of claim 1, wherein said beam receiving portion further comprises a lenslet positioned a distance from said end of each said optical fiber wherein said optical signal passes through said lenslet.

11. The optical cross connect switch of claim 10, wherein said lenslet is formed with a focal distance, and said distance from said end of said optical fiber is approximately equal to said focal distance.

12. An optical cross connect switch comprising:
    a beam generating portion generating a communication beam and an alignment beam wherein said communication beam and said alignment beam propagate away from said beam generating portion in closely spaced paths;
    a beam receiving portion having at least two output fibers, each output fiber formed with a core and having an associated position sensor in a known position relative to said core;
    a beam directing portion positionable to direct said communication beam to said core of one said output fiber of said at least two output fibers, and said alignment beam to a location on said associated position sensor, wherein said associated position sensor generates a position signal corresponding to said location; and
    a controller receiving said position signal and generating an optical feedback control signal, wherein said beam directing portion receives said optical feedback control signal and adjusts said beam directing portion to position said communication beam on said core.

13. The optical cross connect switch of claim 12, wherein said beam generating portion further comprises a substrate formed with a fiber alignment hole for receiving an optical fiber having an end and retaining said end of said optical fiber in a known location relative to said alignment beam, wherein said communication beam propagates from said end of said optical fiber.

14. The optical cross connect switch of claim 13, wherein said beam generating portion further comprises a panel formed with a lenslet, said lenslet positioned adjacent said end of said optical fiber to collimate said communication beam.

15. The optical cross connect switch of claim 13, wherein said beam generating portion further comprises a panel formed with a lenslet positioned in said alignment beam to collimate said alignment beam.

16. The optical cross connect switch of claim 15, wherein said paths of said communication beam and said alignment beam are substantially parallel.

17. The optical cross connect switch of claim 12, wherein said paths of said communication beam and said alignment beam are parallel.

18. The optical cross connect switch of claim 12, wherein said paths of said communication beam and said alignment beam are converging.

19. The optical cross connect switch of claim 18, wherein said beam generating portion and said beam receiving portion are separated by an optical path having a length, and wherein said communication beam and said alignment beam cross approximately midway along said optical path.

20. The optical cross connect switch of claim 12, wherein said paths of said communication beam and said alignment beam are coaxial.

21. The optical cross connect switch of claim 12, wherein said beam receiving portion further comprises a substrate formed with a plurality of fiber alignment holes, one said fiber alignment hole for receiving each said optical fiber and positioning said core of said optical fiber.

22. The optical cross connect switch of claim 19, wherein said beam receiving portion further comprises a panel separated from said end of said fiber by a distance, and having a lenslet positioned in said communication beam wherein said communication beam passes through said lenslet.

23. The optical cross connect switch of claim 22, wherein said lenslet has a focal length, and said focal length is approximately equal said distance wherein said communication beam focusses on said core.

24. The optical cross connect switch of claim 21, wherein said beam receiving portion further comprises a panel separated from said position sensor by a distance, and having a lenslet position in said alignment beam wherein said alignment beam passes through said lenslet.

25. The optical cross connect switch of claim 24, wherein said lenslet has a focal length, and said focal length is approximately equal said distance wherein said alignment beam focusses on said sensor to form a spot.

26. The optical cross connect switch of claim 12, wherein said position 2 sensor of said beam receiving portion further comprises a plurality of light sensing elements.

27. The optical cross connect switch of claim 26, wherein said position 2 sensor further comprises a CMOS sensor.

28. The optical cross connect switch of claim 12, wherein said position sensor further comprises a position sensitive diode.

29. The optical cross connect switch of claim 12, wherein said beam directing portion further comprises an interface for receiving switching information from a telecommunication system, said switching information further comprises the specification of a input fiber, and the specification of a target output fiber.

30. The optical cross connect switch of claim 29, wherein said beam directing portion further comprises a means for directing said communication beam and said alignment beam to said target output fiber.

31. The optical cross connect switch of claim 30, wherein said means for directing further comprises a micro electromechanical system (MEMS) device.

32. The optical cross connect switch of claim 30, wherein said means for directing further comprises a movable mirror.

33. The optical cross connect switch of claim 30, wherein said means for directing further comprises a first panel and a second panel, said first panel formed with a beam director, and said second panel formed with a plurality of beam directors, one said beam director corresponding to each said output fiber, wherein said communication beam and said alignment beam propagate from said beam director of said first panel to one said beam director of said second panel and to said core of said output fiber.

34. The optical cross connect switch of claim 33, wherein each output fiber has an optical axis, and said corresponding beam director of said plurality of beam directors is positioned along said optical axis.

35. The optical cross connect switch of claim 33, wherein said beam director portion further comprises a turning mirror surface optically positioned between said first panel and said second panel wherein said communication beam and said alignment beam propagate from said directing element of said first panel to said turning mirror and to said beam directing element of said second panel.

36. The optical cross connect switch of claim 12, wherein said beam generating portion further comprises a substrate formed with a fiber alignment hole for receiving an optical fiber having an end and retaining said end of said optical fiber in a known location relative to said communication beam, wherein said alignment beam propagates from said end of said optical fiber.

37. The optical cross connect switch of claim 12, wherein said beam generating portion further comprises a LED generating illumination, wherein said illumination forms said alignment beam and propagates from said beam generating portion.

38. The optical cross connect switch of claim 37, wherein said beam generating portion further comprises a mask formed with a hole and positioned on said LED wherein said illumination is masked to form said alignment beam.

39. The optical cross connect switch of claim 37, wherein said beam generating portion further comprises a substrate formed with a lenslet positioned in said alignment beam to collimate said alignment beam.

* * * * *